Aug. 29, 1972
C. H. WATKINS
3,687,629
HYDROCARBON DESULFURIZATION AND SULFUR RECOVERY
Filed Oct. 26, 1970
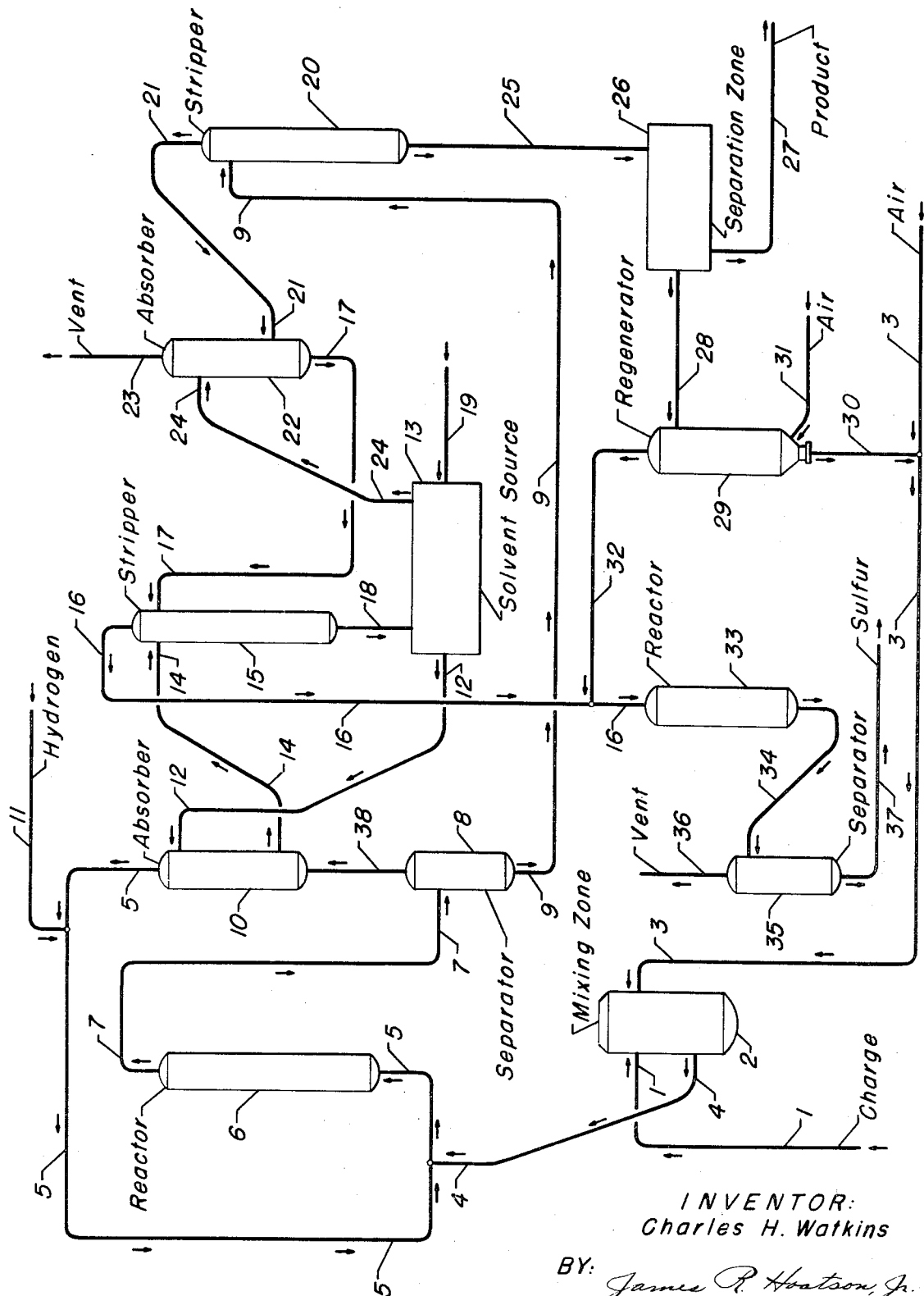
INVENTOR:
Charles H. Watkins
BY: *James R. Hoatson, Jr.*
*Robert W. Erickson*
ATTORNEYS United States Patent Office 3,687,629
Patented Aug. 29, 1972

3,687,629
HYDROCARBON DESULFURIZATION AND
SULFUR RECOVERY
Charles H. Watkins, Arlington Heights, Ill., assignor to
Universal Oil Products Company, Des Plaines, Ill.
Filed Oct. 26, 1970, Ser. No. 84,091
Int. Cl. C01b 17/06
U.S. Cl. 423—244        6 Claims

ABSTRACT OF THE DISCLOSURE

A process for effecting the desulfurization of a hydrocarbonaceous charge stock accompanied by the recovery of sulfur therefrom. Catalyst regeneration facilities are integrated within the process, and the sulfur dioxide resulting therefrom is reacted with hydrogen sulfide, resulting from the conversion of the sulfurous compounds in the charge stock, to produce elemental sulfur.

APPLICABILITY OF INVENTION

The present invention is directed toward a combination process for effecting the desulfurization of heavy hydrocarbonaceous material and for recovering elemental sulfur from the waste products thereof. More specifically, the present invention is directed toward a process for desulfurizing and converting atmospheric tower bottoms products, vacuum tower bottoms products, crude oil residuum, coal oil extracts, topped crude oils, tar sand oil extracts, etc., all of which have become known in the art as "black oils."

These black oils generally contain high molecular weight sulfurous compounds in exceedingly large quantities, and, in addition, excessive quantities of nitrogenous compounds, high molecular weight organo-metallic complexes, principally comprising nickel and vanadium, and heptane-insoluble asphaltic material. An abundant supply of such hydrocarbonaceous material exists, most of which has a gravity less than 20.0° API, and a significant proportion of which has a gravity less than about 10.0° API. This material is generally further characterized by a boiling range which indicates that 10.0% or more, by volume, boils at temperatures above about 1050° F. The abundant supply of these hydrocarbonaceous black oils demands conversion for the purpose of satisfying the ever-increasing need for greater quantities of lower-boiling distillables—i.e., those hydrocarbons boiling below a temperature of about 1050° F.

The physical and chemical characteristics of a black oil generally preclude fixed-bed catalytic processing, since the effective catalyst life is severely hampered through the decomposition of metallic contaminants, coke and sulfur, etc. Recent investigations have indicated that an economically feasible process can be realized through the utilization of a finely-divided, catalytically active metallic component. In general, the catalytically active metallic component is selected from the group consisting of the metals of Groups IV-B, V-B, VI-B and the iron-group of the Periodic Table, which metals may be unsupported, or combined with a carrier material. The finely-divided catalytic composite is initially admixed with the charge stock in the form of the oxide of the metal. This is rapidly converted, under the conditions of operation, into metallic sulfides. Following separation of the catalytic composite from the normally liquid product effluent, regeneration is effected by burning the sludge which converts the metallic sulfide into the metal oxide for recycle to combine with fresh hydrocarbonaceous charge stock. A consequence of the catalyst regeneration techniques resides in the fact that exceedingly large volumes of sulfur dioxide are also produced. Coupled with the fact that the sulfurous compounds within the charge stock are converted into hydrocarbons and hydrogen sulfide, the latter also in exceedingly large volumes, there is presented a serious problem respecting disposal of the hydrogen sulfide and sulfur dioxide gaseous waste streams.

It is generally acknowledged that these two sulfurous streams constitute a major source of atmospheric pollution. The present invention solves this problem by essentially converting the hydrogen sulfide and sulfur dioxide into elemental sulfur and water. The production of the elemental sulfur provides additional economic benefit in that the same can be utilized in the pulp and paper industry, in the manufacture of sulfuric acid, as an agricultural fungicide, in rubber vulcanization, in colloidal form, as a nucleating agent, for photographic films, etc. Another use constitutes the preparation of sulfur-35 via pile radiation, which compound is employed primarily as a research tool in studying the mechanism of rubber vulcanization, the mechanism of the polymerization of synthetic rubber, etc.

Essentially, therefore, the present invention involves reacting a heavy hydrocarbonaceous charge stock and hydrogen in contact with a metal oxide catalyst. The resulting metal sulfide is separated from the product effluent, and regenerated in contact with oxygen to produce sulfur dioxide and the metal oxide. The hydrogen sulfide resulting from the conversion of sulfurous compounds is reacted with the sulfur dioxide, thereby producing elemental sulfur. The converted metal oxide is then recycled to combine with fresh charge stock.

OBJECTS AND EMBODIMENTS

An object of the present invention is to effect the desulfurization of heavy hydrocarbonaceous charge stocks. A corollary objective is to inhibit atmospheric pollution by the hydrogen sulfide resulting from the conversion of sulfurous compounds.

Another object of the present invention is to eliminate atmospheric pollution caused by the sulfur dioxide which is produced in a catalyst regeneration system.

Another object of my invention is to recover elemental sulfur from a sulfurous hydrocarbonaceous charge stock.

Therefore, in one embodiment, my invention affords a process for desulfurizing a hydrocarbonaceous charge stock and for recovering sulfur therefrom, which process comprises the steps of: (a) reacting said charge stock and hydrogen in contact with a metal oxide catalyst, in a hydrocarbon conversion zone, at desulfurizing conditions selected to convert sulfurous compounds into hydrogen sulfide and hydrocarbons, and to convert said metal oxide to metal sulfide; (b) separating the resulting reaction zone effluent, in a first separation zone, to provide a hydrogen sulfide-containing first gaseous phase and a metal sulfide/hydrocarbon slurry; (c) separating said slurry, in a second separation zone, to provide a second hydrogen sulfide-containing gaseous phase and to recover (1) a desulfurized hydrocarbon product, and (2) a concentrated metal sulfide; (d) regenerating said metal sulfide in an oxygen-containing atmosphere to produce a metal oxide and sulfur dioxide; and, (e) reacting said sulfur dioxide and at least a portion of said hydrogen-sulfide gaseous phases to produce elemental sulfur.

In another embodiment, the first and second hydrogen sulfide-containing gaseous phases are separated, in a third separation zone, to provide a substantially hydrogen sulfide-free hydrogen-rich stream and to concentrate said hydrogen sulfide, reacting at least a portion of the latter with said sulfur dioxide.

SUMMARY OF INVENTION

As hereinbefore set forth, one function of the present invention resides in the conversion of hydrocarbonaceous black oils to minimum bottoms. That is, the maximum conversion of asphaltic charge stocks to distillable, lower-boiling hydrocarbon products, while simultaneously minimizing the quantity of both the residuum, or pitch, as well as light, normally gaseous hydrocarbons including methane, ethane and propane. The conversion is effected by reacting the hydrocarbonaceous black oil and hydrogen in admixture with a finely-divided metal oxide catalyst selected from the metals of Groups IV-B, V-B, VI-B and the iron-group of the Periodic Table. Thus, suitable catalytic composites are the unsupported oxides of titanium, zirconium, hafnium, vanadium, niobium, tantalum, chromium, molybdenum, tungsten, iron, cobalt and nickel as well as intimate physical mixtures thereof.

While unsupported metal oxides are preferred in the present slurry-type process, they may be combined with a refractory material including alumina, silica, zirconia, boria, beryllia, mixtures thereof, etc. The metal oxide is employed in amount within the range of about 0.1% to about 20.0% by weight of the hydrocarbonaceous charge stock, calculated as the elemental metal. A narrower range of catalyst concentration is preferred, and is generally about 0.4% to about 10.0% by weight.

The total charge to the reaction chamber is heated to a temperature above about 500° F. and preferably one within the range of about 600° F. to about 800° F. Since the reactions being effected are primarily exothermic, a temperature rise within the reaction chamber will be experienced. The precise temperature to which the total charge to the reaction zone is heated, is determined, therefore, by the reaction chamber peak temperature, the latter being maintained within the range of from about 700° F. to about 900° F. The quantity of hydrogen in admixture with the hydrocarbonaceous charge stock, is based upon the amount of fresh hydrocarbon charge stock, exclusive of any liquid recycle, and is in an amount of from about 3,000 to about 30,000 s.c.f./bbl. The reaction chamber will be maintained under an imposed pressure within the range of about 500 to about 5,000 p.s.i.g. Intermediate pressure levels are generally preferred, and include pressures within the range of about 1,500 to about 3,500 p.s.i.g.

The residence, or contact time within the reaction chamber will generally range from about 30 seconds to about 2 minutes. The precise residence time for a given charge stock is a function of temperature and the UOP K-factor. For example, a charge stock having a K-factor of 12.6, characteristic of a highly, easily cracked paraffinic stock will experience a lower residence time, at a given temperature, than a charge stock having a K-factor of about 11.2, characteristic of a highly refractory material. The product effluent is initially separated to provide a hydrogen-rich gaseous phase, ultimately to be recycled to the reaction chamber in admixture with hydrocarbon charge stock, and a normally liquid hydrocarbon/metal sulfide slurry. The hydrogen-rich stream, prior to being recycled, is treated for the purpose of removing hydrogen sulfide therefrom. This may be effected in any manner well known to those having expertise in the art, a preferred technique involving an adsorber wherein the hydrogen sulfide is removed by a suitable solvent such as monoethanolamine.

The slurry is passed into a hydrogen sulfide stripping zone wherein a second hydrogen sulfide-containing gaseous phase is removed as an overhead stream, with the slurry being removed as a bottoms fraction. Hydrogen sulfide is again adsorbed from the gaseous phase, through the utilization of monoethanolamine, and introduced into a suitable stripping zone along with the first hydrogen sulfide-rich monoethanolamine, for the desorption of the hydrogen sulfide.

The stripped catalyst/hydrocarbon slurry is passed into a suitable separation zone, such as a filter or series of centrifuges, wherein the normally liquid hydrocarbon product is separated fromt he catalyst-containing sludge. The sludge is regenerated in contact with air, resulting in the production of sulfur dioxide and a metal oxide. The metal oxide particles are then transferred, by way of an air stream, into a suitable mixing zone wherein they are admixed with fresh hydrocarbon charge stock.

The sulfur dioxide and hydrogen sulfide are then reacted at an elevated temperature to produce water and elemental sulfur. The reaction temperature is such that the sulfur produced exists in the molten state, and lies within the range of about 500° F. to about 900° F. The effluent is cooled, and the molten sulfur is separated from the hot flue gases in a suitable separation zone.

Other operating conditions and preferred operating techniques will be given in conjunction with the following description of the present process. In further describing the process, reference will be made to the accompanying drawing which illustrates one embodiment of the present invention.

DESCRIPTION OF DRAWING

In the drawing, the embodiment is presented by means of a simplified flow diagram in which details such as pumps, instrumentation and controls, heat-exchange and heat-recovery circuits, start-up lines, compressors, valving and similar hardware have been omitted as being non-essential to an understanding of the techniques involved. The use of such miscellaneous appurtenances, to modify the process, are well within the purview of one skilled in the art of petroleum refining techniques.

The drawing will be described in conjunction with a commercially-scaled unit designed to desulfurize the vacuum bottoms product from an Ahwaz crude oil. The charge stock has a gravity of 10.0° API and an initial boiling point of about 1,000° F., and contains 3.6% by weight of sulfur, about 4,000 p.p.m. by weight of nitrogen, 125 p.p.m. of nickel and vanadium, and about 1.5% by weight of asphaltenes.

The charge stock, in an amount of about 10,000 barrels per day, is introduced by way of line 1 into mixing zone 2, wherein about 61,300 pounds per day of nickel as nickel oxide are intimately admixed therewith; the nickel oxide is introduced into mixing zone 2 by way of line 3. Since the finely-divided nickel oxide is introduced by way of air transfer, mixing zone 2 is equipped with a suitable cyclone separator through which the transfer air is vented; this technique is not illustrated in the accompanying drawing. The charge stock/nickel oxide slurry is withdrawn by way of line 4, admixed with about 10,000 s.c.f. of hydrogen per barrel in line 5, ond continues through the latter into reactor 6. Although the flow through reactor 6 may be downflow or upflow as illustrated, the latter is preferred from the standpoint of facilitating control over the residence time.

Prior to entering reactor 6, the slurry is raised to a temperature of about 785° F., resulting in a peak reaction chamber temperature of about 835° F. The reaction zone is maintained under a pressure of about 3,000 p.s.i.g. The total product effluent is withdrawn from reactor 6 by way of line 7 and introduced thereby into a high pressure separator 8 at a temperature in the range of about 60° F. to about 140° F. Separator 8 is maintained under substantially the same pressure as reactor 6 allowing only for the pressure drop resulting from fluid flow through the system.

The liquid phase, metal sulfide-containing slurry is withdrawn from separator 8 through line 9, and passed therethrough into a hydrogen sulfide stripping zone 20. The function of the stripper is to remove hydrogen sulfide and other light gases which have been adsorbed in the normally liquid hydrocarbon phase, such gases being removed as an overhead stream by way of line 21. The stripped liquid is removed as a bottom stream through line 25, and is introduced into separation zone 26.

The hydrogen sulfide-containing hydrogen-rich gaseous phases from separator 8 is introduced into a monoethanolamine adsorber 10 by way of line 38. The ascending gaseous stream contacts a descending monoethanolamine solvent from line 12. The hydrogen-rich gas, substantially free of hydrogen sulfide is recycled to reaction zone 6 by way of line 5, after the addition thereto of make-up hydrogen, introduced by way of line 11, in an amount to supplant that consumed in the overall process.

The rich adsorbent is removed from adsorber 10 by way of line 14, and introduced thereby into stripper 15, from which the hydrogen sulfide is withdrawn as an overhead stream in line 16. The lean solvent is withdrawn by way of line 18 into a suitable solvent source 13. With respect to the overhead gaseous phase from stripper 20, the same is introduced into monoethanolamine adsorber 22 by way of line 21, therein contacting a descending lean solvent introduced by way of line 24. Gaseous components other than hydrogen sulfide are vented through line 23, and are normally characterized as flue gas. The hydrogen sulfide-rich solvent is introduced into stripper 15 by way of line 17. Make-up solvent is introduced into the process by way of line 19.

Separation zone 26 serves to separate the liquid phase/metal sulfide slurry in order to recover the desulfurized, normally liquid product effluent through line 27, and to provide a sludge which is introduced into regenerator 29 by way of line 28. Air is introduced into regenerator 29 through line 31, and converts the metal sulfide into metal oxide thereby forming sulfur dioxide which is withdrawn through line 32. The sulfur dioxide is combined with the hydrogen sulfide in line 16 and, after heating to a temperature within the range of about 500° F., to about 900° F., is introduced thereby into reactor 33. The hydrogen sulfide and sulfur dioxide react to form water and elemental sulfur, which effluent is withdrawn from reactor 33 through line 34 and introduced into separation zone 35, wherein the molten sulfur is separated from hot flue gases, the latter being vented by way of line 36 while the former is recovered through line 37.

The regenerated metal oxid catalyst is withdrawn from regenerator 29 through line 30, and is transferred through line 3, utilizing an air stream, into mixing zone 2. Component yields and product distribution are indicated in the following Table I, and are inclusive of a total hydrogen consumption, based upon the fresh feed charge stock of 1.39% by weight, or about 911 s.c.f./bbl. Pertinent product properties of the various normally liquid component streams are presented in Table II.

TABLE I.—COMPONENT YIELD AND DISTRIBUTION

| Component | Weight percent | Volume percent |
|---|---|---|
| Ammonia | 0.14 | |
| Hydrogen sulfide | 2.99 | |
| Methane | 0.59 | |
| Ethane | 0.62 | |
| Propane | 0.97 | |
| Butanes | 0.94 | 1.62 |
| Pentanes | 0.76 | 1.21 |
| Hexanes | 1.21 | 1.75 |
| Heptane, 340° F | 4.05 | 5.40 |
| 340° F.–660° F | 29.88 | 34.78 |
| 660° F.–1,050° F | 33.14 | 35.80 |
| Residuum | 26.10 | 25.00 |

TABLE II.—PRODUCT PROPERTIES

| Component | ° API | Sulfur, wt. percent |
|---|---|---|
| Pentane, 340° F | 60.6 | 0.12 |
| 340° R.–660° F | 33.2 | 0.33 |
| 660° F.–1,050° F | 21.3 | 0.80 |
| Residuum | 4.0 | 2.10 |
| 340° F. plus | 22.8 | 0.97 |

In addition to achieving approximately 75.0% conversion to distillable hydrocarbons, the present process has effected a substantial degree of desulfurization. Through the reaction of the hydrogen sulfide and sulfur dioxide, 98,400 lbs./day of elemental sulfur are recovered.

I claim as my invention:

1. A process for desulfurizing a hydrocarbonaceous charge stock and for recovering sulfur therefrom which comprises the steps of:
   (a) reacting said charge stock and hydrogen in contact with a metal oxide catalyst, in a hydrocarbon conversion zone, at desulfurizing conditions selected to convert sulfurous compounds into hydrogen sulfide and hydrocarbons, and to convert said metal oxide to metal sulfide;
   (b) separating the resulting effluent, in a first separation zone to provide an hydrogen sulfide-containing first gaseous phase and a metal sulfide/hydrocarbon slurry containing hydrogen sulfide;
   (c) separating said slurry, in a second separation zone, to provide a second hydrogen sulfide-containing gaseous phase and to recover (1) a desulfurized hydrocarbon product, and (2) a concentrated metal sulfide;
   (d) regenerating said metal sulfide in an oxygen-containing atmosphere to produce a metal oxide and sulfur dioxide; and
   (e) reacting said sulfur dioxide and at least a portion of each of said hydrogen-sulfide gaseous phases to produce elemental sulfur.

2. The process of claim 1 further characterized in that the regenerated metal oxide catalyst is recycled to said hydrocarbon conversion zone.

3. The process of claim 1 further characterizd in that said first and second hydrogen sulfide-containing gaseous phases are separated, in a third separation done to provide a substantially hydrogen sulfide-free, hydrogen-rich stream and to concentrate said hydrogen sulfide, reacting at least a portion of the latter with said sulfur dioxide.

4. The process of claim 3 further characterized in that at least a portion of said hydrogen-rich stream is recycled to said hydrocarbon conversion zone.

5. The process of claim 3 further characterized in that said third separation zone is a monoethanolamine adsorption zone.

6. The process of claim 1 further characterized in that said metal oxide catalyst comprises the oxide of at least one metal selected from the group consisting of the metals of Groups IV–B, V–B, VI–B and the iron-group.

References Cited

UNITED STATES PATENTS

| 3,533,960 | 10/1970 | Weinert | 208—217 |
| 2,963,348 | 12/1960 | Sellers | 23—225 R |
| 2,757,127 | 7/1956 | Porter et al. | 208—212 |
| 2,968,614 | 1/1961 | Brooks et al. | 208—213 |
| 3,531,398 | 9/1970 | Adams et al. | 208—216 |

OSCAR R. VERTIZ, Primary Examiner

G. O. PETERS, Assistant Examiner

U.S. Cl. X.R.

208—213; 252—411 S